Feb. 13, 1968   W. T. RENTSCHLER   3,368,469
PHOTOGRAPHIC SHUTTER WITH ELECTRONICALLY CONTROLLED TIMING
Filed June 8, 1965   2 Sheets-Sheet 1
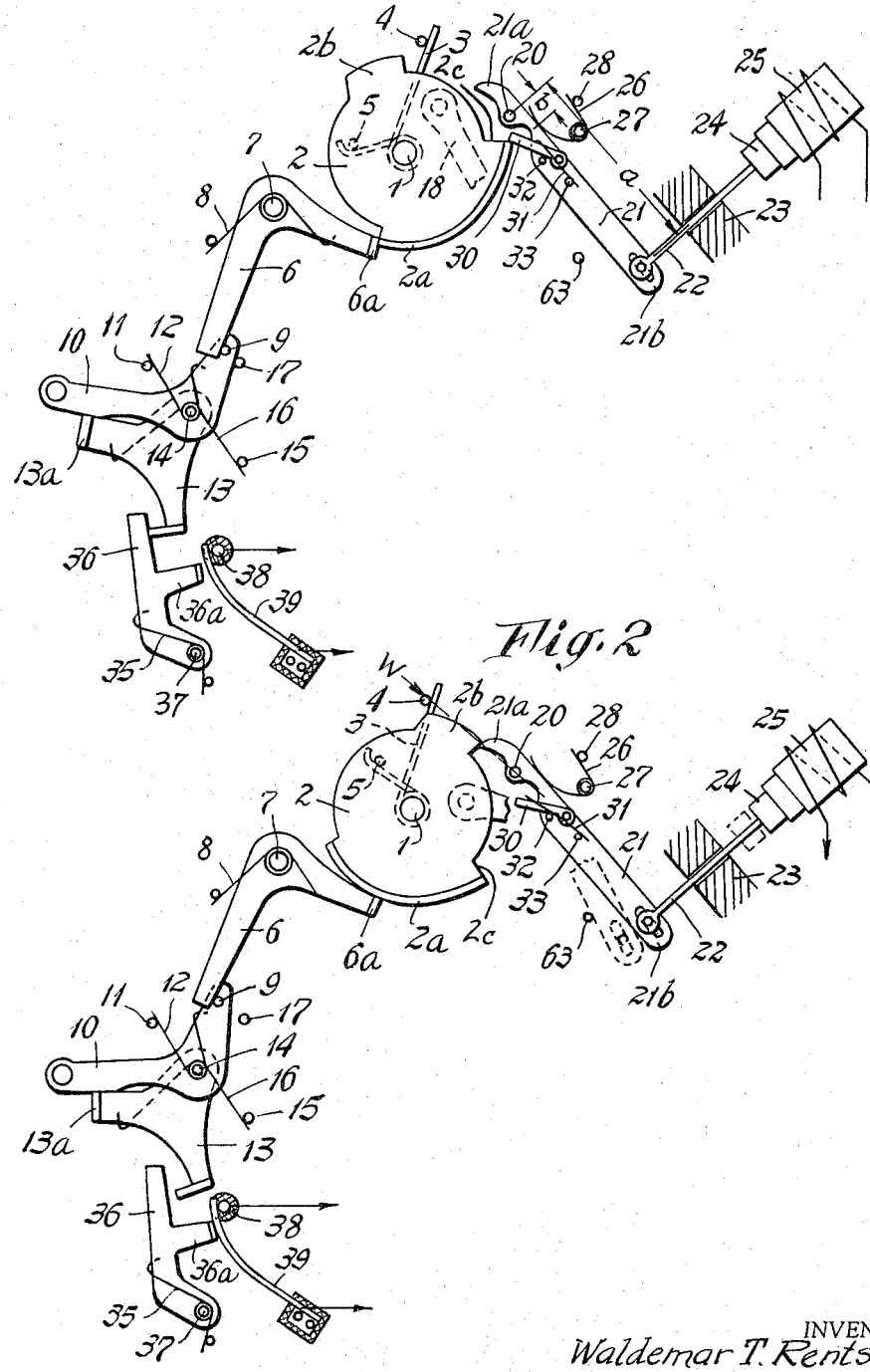
INVENTOR.
Waldemar T. Rentschler
BY
Arthur A. March
ATTORNEY

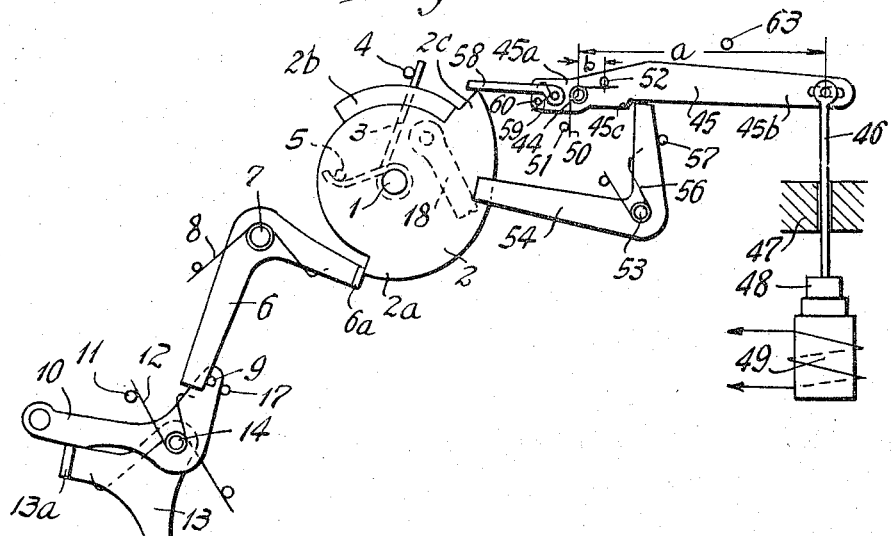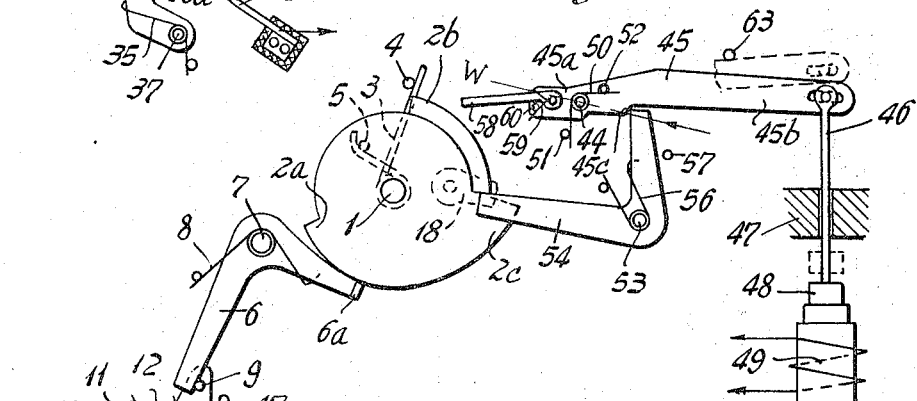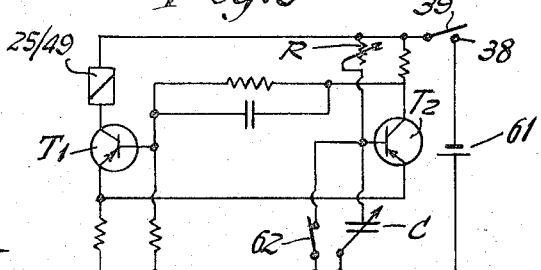

United States Patent Office 3,368,469
Patented Feb. 13, 1968

3,368,469
PHOTOGRAPHIC SHUTTER WITH ELECTRON-
ICALLY CONTROLLED TIMING
Waldemar T. Rentschler, Gauthier-Strasse 41,
Calmbach, Black Forest, Germany
Filed June 8, 1965, Ser. No. 462,252
Claims priority, application Germany, June 12, 1964,
G 40,830
8 Claims. (Cl. 95—53)

ABSTRACT OF THE DISCLOSURE

An actuating mechanism for a photographic shutter having an electronic timing device and a movable shutter blade. Driving means are provided for operating the shutter blades, and the driving means comprises a member adapted to exert a driving force along a predetermined line. An arresting lever is provided mounted on a pivot axle so that the driving force, acting along the predetermined line passes substantially through the axle. An electromagnet is connected in the timing circuit so as to be energized thereby. Mechanical means are provided for connecting the lever to the electromagnet to block the member and thereby hold the shutter blade in the open position as long as the electromagnet is energized by the circuit. A restoring spring is provided which bears upon the lever to move it out of the blocking position as soon as the electromagnet is deenergized so that the member can exert a driving force on the shutter blade to move the shutter blade to the closed position.

---

This invention relates to a photographic shutter with electronically controlled timing in which the shutter actuating mechanism can be blocked by a releasable locking device in a position corresponding to the open position of the shutter blades for a time determined by the electronic circuit. In particular, this invention is directed to the solution of the problem of providing a photographic shutter with electronically controlled timing means and a simple structure, the timing means being arranged to assure dependable operation of the shutter even when the moment of rotation of the shutter blade driving mechanism is extremely high.

In accordance with the present invention and arresting lever is arranged to be rotatably positioned on a fixed axis and under the influence of a magnet, on the one hand, and a restoring force counteracting the force of attraction of the magnet on the other hand. The arresting lever is associated with a member of the shutter blade driving mechanism to be blocked in such a manner that the line of impact force to be absorbed passes substantially through the bearing axis. It is thus possible to create, by comparatively simple means, a locking device which insures functional dependability of operation of the shutter because large torque loads are kept away from the arresting lever, even if the driving moment of that member of the shutter device which is to be blocked is high. This, in turn, has the advantage that a magnet with a comparatively small magnetic field can be used for the purpose of blocking the shutter blade driving member and that the moment of attraction of the magnet as such need not be greater than the moment of rotation of the restoring spring acting on the arresting lever.

In order to be able to use as weak a magnet as possible, that is, one with small holding power, and at the same time to be able to use a strong restoring spring, the invention further proposes that the magnet acts on the arresting lever with respect to the pivoting axis thereof with a lever arm, which is several times as large as the lever arm of the spring that also acts on the arresting lever. In this way the locking device can be actuated both quickly and dependably.

Still another feature of the invention is that the portion of the shutter drive which cooperates with the arresting lever includes a cam, or the like, which, in acting upon the arresting lever during the final phase of the cocking motion of the driving member, causes an armature that is operatively connected to the arresting lever to be guided so that it engages the magnet. An important advantage of the arrangement is that the magnet merely has to produce the force for holding the arresting lever, while the armature that cooperates with the magnet is moved positively into the holding position during the cocking motion. In order to compensate for possible differences between the cocking path of the shutter drive and that of the arresting lever, the invention also provides that either the cam or the part of the arresting lever engaged by the cam be made so as to yield elastically. The device may be arranged so that a strap is articulately mounted on the arresting lever and yieldingly supported with respect to the lever by means of a spring.

In order that the arresting lever may take into account the constructional features of the photographic shutter with which it is to operate, one of the features of the invention is that a fixedly positioned catch lever be associated with the arresting lever and be made in the form of an angle, or bell crank lever, one end of which cooperates with the member of the shutter drive to be blocked and the other end of which cooperates with the arresting lever. In this case the construction and arrangement of the catch lever as well as of a supporting edge that is designed to be engaged by the catch lever and is located on the arresting lever are such that the impact force is introduced approximately in the longitudinal direction of the arresting lever. In order to compensate for possible differences between the cocking path of the shutter drive and that of the arresting lever, the arresting lever may comprise, in this arrangement, a rotatably positioned, spring loaded pawl at its free lever arm. This pawl operates with a cam which is mounted on the driving member and becomes operative in the final phase of the cocking motion.

Details of the invention will become apparent from the specification that follows and from the drawing which illustrates two embodiments of the subject matter of the invention and in which:

FIG. 1 shows one embodiment of a locking device in locking position as well as in connection with the shutter drive occupying the cocked position;

FIG. 2 shows the mechanism of FIG. 1 after release of the shutter drive and with the driving member thereof blocked by the locking device for the duration of the exposure time;

FIG. 3 shows another embodiment of a locking device having an arresting lever associated with a catch lever, the locking device again occupying the locking position and the driving member occupying the cocked position;

FIG. 4 shows the arrangement according to FIG. 3, but after the shutter drive has been released; and FIG. 5 shows the wiring diagram of an electronically controlled timing device.

For reasons of clarity, the shutter housing as well as the base plate used for positioning the individual structural members of the shutter are not shown in the drawing. A shaft 1 positioned on the base plate furnishes conventional rotational support for a driving disc 2 with respect to the base plate. The disc 2 is non-rotatably connected to the shaft 1, the free end of which may project from the rear of the shutter in a manner known per se and may be coupled to the film transport device of the camera for cocking the driving disc 2. The driving disc 2 is acted on by a driving spring 3 which is arranged on the shaft 1 so that one end of the spring abuts against a fixed pin 4 and the other end against a pin 5 of the disc, thereby exerting a clockwise moment of rotation on the disc.

In order to hold the driving disc 2 in the cocked position illustrated in FIGS. 1 and 3, a lever 6 is provided which is rotatably mounted on a shaft 7 and is acted on by a coil spring 8 that tends to rotate the lever counter-clockwise. A bent-off lug 6a on one arm of the lever 6 engages a projection 2a of the driving disc when the latter is in cocked position. The other arm of the lever 6 is located in the range of motion of a pin 9 which, in turn, is secured to the free end of a lever 10 designed to release the shutter drive mechanism. The release lever 10 is resiliently biased by a coil spring 12, one end of which engages a fixed pin 11, and rotatably mounted, along with another lever 13, on a shaft 14. The lever 13 is acted on by a coil spring 16 supported by a fixed pin 15 and has a bent-off lug 13a that engages the release lever 10. The two springs exert on the levers 10 and 13 a clockwise moment of rotation, which is absorbed by an end stop 17 in the path through which the release lever 10 moves. As is apparent from the drawing, the driving mechanism for the shutter blades is formed as a crank drive, and the shutter blades (not shown in the drawing) can be moved into open and closed position, in a manner known per se, by means of a driving pawl 18 articulately connected to the driving disc 2 and drivingly connected to a driving ring (not shown).

In order to obtain exposure times of different duration, the invention provides for an electronically controlled timing device the wiring diagram for which is illustrated in FIG. 5. This device is designed to control a locking device which will be described in detail hereinafter and which blocks the shutter drive mechanism in the open position of the shutter blades for an interval of longer or shorter duration when the shutter blades have reached the open position. The locking device can be associated with the driving disc 2 of the shutter drive mechanism and can be formed, in accordance with the embodiment illustrated in FIGS. 1 and 2, primarily of an arresting lever 21 pivotally mounted on a fixed shaft 20. In addition the location of the pivot shaft 2 may be such as to divide the lever 21 into a shorter arm 21a and a longer arm 21b. A connecting rod 22 is articulately connected to the free end of the arm 21b and is longitudinally displaceably mounted in a guide member 23. The other end of the connecting rod 22 is firmly connected to the armature 24 of the magnet 25. The magnet may be either an electromagnet or a permanent magnet with an additional coil. The lever arm 21a cooperates with a projection 2b on the driving member 2 and therefore may constitute a catch arm.

In order to keep any rotational forces away from the arresting lever 21 during the time that it is arresting the operation of the shutter, the arresting lever 21 is so arranged with respect to the driving disc 2 that the impact on the lever by the projection 2b is almost tangential and is indicated by the vector W. As may be seen this line of force passes substantially through the axis of the shaft 20 in FIG. 2. In addition to the magnet 25 a restoring spring 26 is also associated with the arresting lever 21 to counteract the effective force of the magnet. The spring may be in the form of a coil spring arranged on a fixed pivot pin 27 with one end of the spring abutting against a fixed pin 28 and the other end bearing directly upon the arresting lever 21. While the connecting rod 22 attached to the armature 24 is articulately connected to the arm 21a at a point such that the lever arm is indicated by the letter $a$ in FIG. 1, this spring 26 bears upon the lever 21 at a point much closer to the shaft 20 so that the effective lever arm of the spring is indicated by the letter $b$, which is several times smaller than the lever arm $a$. Thus the forces acting on the arresting lever 21 make it possible to use a comparatively strong restoring spring 26 and a comparatively weak magnet 25.

As is further apparent from FIGS. 1 and 2 a flap 30 is articulately connected to the lever arm 21b and a coil spring 31 bears against this flap to keep it in engagement with the pin 32 on the lever 21. The coil spring 31 is preferably stronger than the restoring spring 26 and, as may be seen in FIG. 1, the strip 3 cooperates with a cam 2c on the driving disc 2 extending radially over the circumference thereof. In the final phase of the cocking motion of the driving disc 2, the cam 2c engages the strip 30 and thereby moves the armature 24 by way of the arresting lever 21 and the connecting rod 22 into the field of the magnet 25. As a result the magnet 25 need not attract the armature but merely needs to retain it in the position to which it has been brought. While the stop pin 32 on the lever 21 limits the motion of the flap 30 in one direction, another pin 33 is engaged by the spring 31. The cam 2c may act directly on the lever arm 21b but possible differences between the cocking path of the driving member 2 and of the arresting lever 21 can be compensated by the elastically yielding engagement obtained by means of the spring biased flap 30.

As may be seen in the drawing there is associated with the release lever 10 an actuating lever 36 that engages the lever 13 due to the action of a spring 35 and which is mounted on a fixed pivot pin 37 and is designed to influence a contact switch to be operated synchronously with the release of the shutter drive mechanism. The contact switch, which can be actuated by an arm 36a of the actuating lever 36, consists mainly of a fixed contact pin 38 and a contact spring 39 cooperating therewith. The two contact members 38 and 39 are insulated with respect to the other shutter members.

FIGS. 3 and 4 show another embodiment of a locking device for shutters with electronically controlled timing means. The members designed to drive the shutter blades as well as the locking and release members cooperating with the driving mechanism have the same reference numerals as the corresponding elements shown in FIGS. 1 and 2 since they coincide with the members of FIGS. 1 and 2 both structurally and functionally. The locking device in FIGS. 3 and 4 consists mainly of an arresting lever 45 rotatably mounted on a fixed pin 44 and having a comparatively short lever arm 45a and a comparatively long lever arm 45b. A connecting rod 46 is articulately connected to one end of the arresting lever 45 at the distance $a$ with respect to the pin 44 and is journaled in a guide bar 47. The connecting rod cooperates with a magnet 49 by means of an armature 48. Mounted on the pin 44 is a restoring spring 50, which may be a coil spring with one end abutting against a fixed pin 51 and the other against a pin 52 on the arresting lever at a distance $b$ from the shaft 44. The restoring spring always exerts on the arresting lever 45 a rotational force opposite to the rotational force of attraction of the magnet 45.

In order to make the arresting lever 45 more adaptable to the construction of a shutter, a catch lever 54 is associated with the lever 45 and is in the form of an angle lever pivotally mounted on a fixed pin 53. One end of the catch lever cooperates with the lug 2b to be provided on the driving disc 2 and the other end cooperates with a supporting edge 45c on the arresting lever 45. The catch lever is resiliently biased by a spring 56 and is pressed thereby against a fixed pin 57. The construction of the catch lever is such that the impact force that acts upon it when the stop 2b strikes it is transferred to the arresting lever 45 in such a way that the line of force W shown in FIG. 4 passes through the pin 44. The radially projecting cam 2c again cooperates, in the embodiment shown in FIGS. 3 and 4, with a flap, or pawl 58 located near one end of the arresting lever 45 and projecting therefrom. The flap 58 is articulately connected to the lever 45 and is held in contact with a pin 60 on the lever 45 by means of a spring 59.

FIG. 5 is a schematic wiring diagram of an electronic timing device, or circuit, which comprises a delay circuit made up mainly of a resistor and a capacitor. The delay circuit can be connected to a current source 61 by the contact switch 38, 39 which can be actuated by the release lever 10. In series with the switch 38, 39 and the current source 61 is the emitter-collector circuit of a transistor $T_1$ and a magnet which may be either the magnet 25 of FIGS. 1 and 2 or the magnet 49 of FIGS. 3 and 4. A special circuit associated with these elements includes another contact switch 62, a capacitor C connected to the base of a transistor $T_2$, and an adjustable resistor R. The resistor R and the capacitor C determine the time delay of the circuit, which includes additional resistors and capacitors in a standard configuration that need not be described in detail.

The operation of the two embodiments illustrated in FIGS. 1 to 4 of the locking device influenced by the electromagnet in the electronic timing circuit is as follows:

If the shutter release lever 10 of the camera shutter is actuated, the driving disc 2 is released and the contact switch 38, 39 is closed simultaneously. At the same time the contact switch 62 which is not shown in FIGS. 1 to 4 and which is controlled, for example, by the opening motion of the shutter blade driving ring is opened. This permits the transistor $T_1$ to become conductive and blocks current from flowing through the transistor $T_2$ since the base of the transistor $T_2$ is initially at the emitter potential. The flow of current through the emitter-collector circuit of the transistor $T_1$ energizes the magnet 25 or 49, depending upon whether the embodiment of FIGS. 1 and 2 or that of FIGS. 3 and 4 is being used. This keeps the locking device associated with the driving mechanism of the shutter blades, that is, the arresting lever 21 or 45, in locking position. The capacitor C is charged by way of the adjustable resistor R at a rate determined by the capacitance and resistance of these elements, and the charge on the capacitor C continues to build up until the potential applied to the base of the transistor $T_2$ has risen to such an extent that this transistor becomes conductive. At that instant, the feedback coupling to the transistor $T_1$ causes the current through the transistor $T_2$ to increase precipitously while the current through the transistor $T_1$ drops to zero. As a consequence the magnet 25 or 49 is de-energized so that its magnetic field collapses and the locking device associated with the driving mechanism becomes inoperative. Owing to the events just described and to the influence of the restoring spring 26 or 50, the arresting lever 21 or 45 moves into the position indicated by broken lines in FIGS. 2 or 4, respectively, and strikes the end stop 63. Because of the release motion of the arresting lever 21 or 45, the driving disc 2 is released to run down further and in so doing moves the shutter blades from the open position that they previously occupied to the closed position which is also the starting position.

During the subsequent cocking process, the driving disc 2 is moved counterclockwise until the cam 2c provided on the driving disc engages the flap, or pawl, 30 or 58 at the end of the cocking motion, thereby forcing the arresting lever 21 or 45 into the locking position. At the end of the cocking motion the lug 6a of the lever 6 comes to rest in front of the projection 2a or the driving disc 2, thereby retaining the latter once again in the cocked position.

What is claimed is:

1. Actuating mechanism for a photographic shutter comprising: an electronic timing circuit; a movable shutter blade; driving means for operating said shutter blade, said driving means comprising a member adapted to exert a driving force along a predetermined line; an arresting lever; a pivot axle for said arresting lever, said line passing substantially through said axle; an electromagnet connected in said timing circuit to be energized thereby; means mechanically connecting said lever to said electromagnet to block said member and thereby hold said shutter blade in the open position as long as said electromagnet is energized by said circuit; and a restoring spring bearing upon said lever to move it out of the blocking position as soon as said electromagnet is de-energized, whereby said member can exert a driving force on said shutter blade to move said shutter blade to the closed position.

2. The apparatus of claim 1 in which there is a distance $a$ between said axle and the point at which said means connecting said lever to said electromagnet engages said lever, and a distance $b$ between said axle and the point at which said spring acts upon said lever, $a$ being several times as large as $b$.

3. Actuating mechanism for a photographic shutter comprising: an electronic timing circuit; a movable shutter blade; driving means for operating said shutter blade, said driving means comprising a member adapted to exert a driving force along a predetermined line; and arresting lever; a pivot axle for said arresting lever, said line passing substantially through said axle; an electromagnet connected in said timing circuit to be energized thereby; means mechanically connecting said electromagnet to said lever at a point separated from said axle by a distance $a$ to block said member and thereby hold said shutter blade in the open position as long as said electromagnet is energized by said circuit; and a restoring spring bearing upon said lever at a point a distance $b$ from said axle to move said lever out of the blocking position as soon as said electromagnet is de-energized, whereby said member can exert a driving force on said shutter blade to move said shutter blade to the closed position, said member comprising a cam which engages said lever as said driving means is being cocked to push said lever toward said electromagnet.

4. A photographic shutter according to claim 3 in which said cam yields elastically.

5. A photographic shutter according to claim 3 in which said lever comprises an elastically yielding member at the point engaged by said cam.

6. A photographic shutter according to claim 5 in which said elastically yielding member comprises a flap articulately attached to said arresting lever and a second spring bearing on said flap.

7. Actuating mechanism for a photographic shutter comprising: an electronic timing circuit; a movable shutter blade; driving means for operating said shutter blade; an arresting lever comprising a supporting edge; a pivot axle for said arresting lever, said line passing substantially through said axle; an angle lever engaging said member at one end and engaging said supporting edge of said arresting lever at the other end to be pressed by said member against said supporting edge along a line passing substantially through said axle; an electromagnet connected in said timing circuit to be energized thereby; means mechanically connecting said arresting lever to said electromagnet to block said member and thereby hold said shutter blade in the open position as long as said electromagnet is energized by said circuit; and a restoring spring bearing upon said arresting lever to move it out of the blocking position as soon as said electromagnet is de-energized, whereby said member can exert a driving force on said shutter blade to move said shutter blade to the closed position.

8. A photographic shutter according to claim 7 in which said driving member comprises a cam, said shutter comprising, in addition, a pawl pivotally mounted at one end of said arresting lever to engage said cam; and a spring pressing said pawl against said cam, whereby said pawl becomes operative in the final phase of cocking said driving mechanism.

References Cited

UNITED STATES PATENTS

| 2,999,445 | 9/1961 | Fahlenberg | 95—63 |
| 3,043,203 | 7/1962 | Buhrle | 95—10 |
| 3,105,429 | 10/1963 | Weller | 95—63 |

JOHN M. HORAN, *Primary Examiner.*